United States Patent [19]

Takago et al.

[11] Patent Number: 4,804,709
[45] Date of Patent: Feb. 14, 1989

[54] FLUORINE-CONTAINING COATING AGENTS

[75] Inventors: Toshio Takago; Yasushi Yamamoto; Kouichi Yamaguchi, all of Annaka, Japan

[73] Assignee: Shin-Etsu Chemical Co., Ltd., Tokyo, Japan

[21] Appl. No.: 162,682

[22] Filed: Mar. 1, 1988

Related U.S. Application Data

[63] Continuation-in-part of Ser. No. 945,862, Dec. 23, 1986, abandoned.

[30] Foreign Application Priority Data

Dec. 24, 1985 [JP] Japan .................................. 60-296444

[51] Int. Cl.$^4$ ............................................... C08F 8/00
[52] U.S. Cl. ...................................... 525/102; 528/25; 528/17; 528/18
[58] Field of Search ..................... 525/102; 528/25, 18, 528/17

[56] References Cited

U.S. PATENT DOCUMENTS 4,468,492  8/1984  Piccirilli et al. ...................... 525/102
4,491,650  1/1985  Rizk et al. ............................ 525/102

*Primary Examiner*—Melvyn I. Marquis
*Attorney, Agent, or Firm*—Birch, Stewart, Kolasch & Birch

[57] ABSTRACT

A fluorine-containing coating agent which can be used for forming a fluorocarbon resin coating film on a substrate comprises a polymer which has a fluorine-containing polymer as a main chain and an alkoxysilyl group in the side chain and which is obtained by the reaction of a hydroxyl group of a fluorine-containing polymer having the hydroxyl group in the side chain with an isocyanato group of an alkoxysilane having the isocyanato group. The fluorine-containing polymer having a hydroxyl group in the side chain is a copolymer of a fluoro-olefin and a hydroxyalkyl vinyl ether having a straight or branched alkyl group having 2 to 5 carbon atoms. The alkoxysilane having an isocyanato group is a compound represented by the following formula:

$$OCN(CH_2)_3 SiX_n R_{(3-n)} \qquad (I)$$

wherein
R is hydrogen or a monovalent hydrocarbon group haviang 1 to 10 carbon atoms,
X is an alkoxyl group having 1 to 5 carbon atoms, and
n is an integer of 1 to 3.

9 Claims, No Drawings

FLUORINE-CONTAINING COATING AGENTS

This invention is a continuation-in-part of the co-pending application Ser. No. 945,862 filed on Dec. 23, 1986, and now abandoned.

BACKGROUND OF THE INVENTION

1. Field of the Invention

The present invention relates to a fluorine-containing coating agent which is used to form a fluorocarbon resin coating film on the surface of an inorganic or organic material (substrate).

2. Description of the Prior Art

Fluorocarbon resins are polymeric materials having excellent heat stability, weather resistance, solvent resistance and chemical resistance. However, when a fluorocarbon resin film is to be formed on the surface of certain substrates, for example, some inorganic materials such as metals, glasses, cements, etc., or some organic materials such as various plastics, timbers, etc., special treatments of the surfaces of these substrates are required because adhesion of the resins to these materials is poor.

Recently, two package type fluorine-containing coating agents based on fluorine-containing polymers having hydroxyl groups, which are obtained by the copolymerization of fluoro-olefins and hydroxyalkyl vinyl ethers, and cured by using polyvalent isocyanates or methylolmelamines as curing agents have been proposed; reference is made to Japanese Patent Application Laid-open No. 57-34107. Although these agents may provide good coating films which have flexibility and are excellent in surface hardness, gloss, solvent resistance and weather resistance, a further improvement is necessary because adhesion to various substrates is insufficient and these agents are of the two package type.

SUMMARY OF THE INVENTION

Therefore, it is an object of the present invention to provide fluorine-containing coating agents which can be made into the one package type and will form fluorocarbon resin coating films having good adhesion to the surfaces of inorganic and organic materials and excellent properties.

To attain the above described object, the present inventors have been made great efforts and found that it is effective to introduce alkoxy functional silyl groups into the side chain of fluorine-containing polymers to impart crosslinkability and adhesion of the silane to the polymers. Thus, the present inventors have discovered the following: when copolymers of fluoro-olefins and hydroxyalkyl vinyl ethers are used as the fluorine-containing polymer having hydroxyl groups in the side chain and an alkoxysilyl group is introduced into the side chain of the copolymer by reacting the hydroxyl group in the side chain of the copolymer with an isocyanato group of an alkoxysilane represented by the following formula (I):

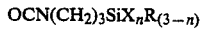 (I)

wherein
R is a hydrogen or a monovalent hydrocarbon group having 1 to 10 carbon atoms,
X is an alkoxyl group having 1 to 5 carbon atoms, and
n is an integer of 1 to 3, the resulting fluorine-containing polymers incorporating alkoxysilyl groups can provide coating films exhibiting excellent adhesion to various substrates without affecting the good properties of fluorocarbon polymers for example, solvent resistance, weather resistance, heat stability, etc., and solutions of such fluorine-containing polymers incorporating alkoxysilyl groups are highly stable and retain good flowability without gelling after a long period storage thereby permitting them to be made into one package type coating agents. The present invention has thus been made in this basis.

Therefore, the present invention provides a fluorine-containing coating agent which can be used to form a fluorocarbon resin coating film on a substrate comprising a polymer which has a fluorine-containing polymer as a main chain and an alkoxysilyl group in the side chain and which is obtained by the reaction of a hydroxyl group of a fluorine-containing polymer having the hydroxyl group in the side chain with an isocyanato group of an alkoxysilane having the isocyanato group, wherein said fluorine-containing polymer having a hydroxyl group in the side chain is a copolymer of a fluoro-olefin, preferably a perhalogenated fluoro-olefin, and a hydroxyalkyl vinyl ether having a straight or branched alkyl group having 2 to 5 carbon atoms, and the alkoxysilane having an isocyanato group is a compound represented by the following formula:

 (I)

wherein
R is a hydrogen or a monovalent hydrocarbon group having 1 to 10 carbon atoms,
X is an alkoxyl group having 1 to 5 carbon atoms, and
n is an integer of 1 to 3.

According to the present invention, because the alkoxysilyl group is introduced into the side chain of the fluorine-containing polymer which constitutes the main component of the coating agent, the hydrolytic property of the alkoxysilyl group is effectively utilized, thereby attaining good adhesion to substrates. The heat stability and weather resistance of the silicone are also effectively utilized. Thus, the alkoxy moiety in the alkoxysilyl group introduced into the side chain of the fluorine-containing polymer is hydrolyzed to generate a silanol, and the silanols are condensed between molecules to form crosslinked linkages which exhibit excellent weather resistance and heat stability. Further, the silanols are reacted with hydroxyl groups of the substrate surface or with an oxidized surface to cause strong bonding of the polymer to the substrate.

The above and other objects, features and advantages of the invention will be more apparent from the following description.

DETAILED DESCRIPTION OF THE INVENTION

The present invention will hereinafter be described in more detail.

The fluorine-containing polymers having a hydroxyl group used in the present invention are obtained by copolymerizing a fluoro-olefin with a hydroxyalkyl vinyl ether. In the copolymerization, there may optionally be used other monomer component(s) such as alkyl vinyl ether in addition to the main monomer components.

The fluoro-olefins may be any compound which is conventionally used as a monomer of fluorocarbon resins, although perhalogenated fluoro-olefins are preferred and chlorotrifluoroethylene, tetrafluoroethylene and mixtures thereof are especially preferred. The fluoro-olefins preferably have 2 to 4 carbon atoms.

The hydroxyalkyl vinyl ethers should have a straight or branched alkyl group having 2 to 5 carbon atoms, although hydroxybutyl vinyl ether is especially preferred.

The fluorine-containing polymers having a hydroxyl group used in the present invention may preferably be produced by using an alkyl vinyl ether as a comonomer in addition to the above described fluoro-olefin and hydroxyalkyl vinyl ether. Such a comonomer can provide flexibility in the resulting copolymer. Preferred alkyl vinyl ethers may contain one or more alkyl groups selected from a cyclohexyl group and straight or branched alkyl groups having 1 to 8 carbon atoms. The copolymers comprising such an alkyl vinyl ether may preferably contain 40 to 70% by mole of the fluoro-olefin so as to exhibit satisfactory heat stability, weather resistance and chemical resistance.

The preferable copolymer may comprise 40 to 65 mole % of the fluoro-olefins, 5 to 40 mole % of cyclohexyl vinyl ether, 5 to 40 mole % of the other alkyl vinyl ethers and 3 to 15 mole % of the hydroxyalkyl vinyl ethers.

Preferably, the fluorine-containing polymers having a hydroxy group have a molecular weight in the range of from 1,000 to 200,000 and 2 to 50 hydroxyl groups in the molecule.

Commercially available fluorine-containing polymers having hydroxyl groups in the side chain which are obtained by copolymerizing the aforementioned monomers may include Lumiflon LF100, 200, 300, 400 and 600, all being manufactured by Asahi Glass Co., Ltd.

The alkoxysilanes having isocyanato groups used in the present invention are those compounds represented by the formula (I):

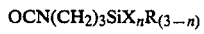

$$OCN(CH_2)_3SiX_nR_{(3-n)} \qquad (I)$$

wherein
R is hydrogen or a monovalent hydrocarbon group having 1 to 10 carbon atoms, preferably an alkyl group having 1 to 4 carbon atoms,
X is an alkoxy group having 1 to 5 carbon atoms, preferably a methoxy or ethoxy group, and
n is an integer of 1 to 3, particularly 2 or 3. These compounds may be present independently or in combination of two or more. Illustrative examples of preferred alkoxysilanes include gamma-isocyanatopropyl methyl diethoxy silane, gamma-isocyanatopropyl triethoxy silane, gamma-isocyanatopropyl methyl dimethoxy silane, and gamma-isocyanatopropyl trimethoxy silane.

As described above, the polymers having a main chain of fluorine-containing polymer and a hydrolyzable alkyoxysilyl group in the side chain employed which constitute fluorine-containing coating agents of the present invention are obtained by the reaction of the fluorine-containing polymer having a hydroxyl group in the side chain with the alkoxysilane having an isocyanato group.

The amounts of the fluorine-containing polymer having a hydroxyl group and the alkoxysilane having an isocyanato group used may preferably be such that the ratio of the number of hydroxyl groups to that of isocyanato groups is 1:0.5 to 1:2.

A metal catalyst such as tin, titanium, etc. or an organometallic catalyst such as dibutyltin laurate, etc. may be utilized in the reaction. Tin, titanium and organometallic catalysts thereof may be preferred since these catalysts can efficiently promote the reaction and also can accelerate the hydrolysis of the alkoxysilyl group of the polymer obtained by the reaction as well as crosslinking by condensation of the silanol obtained from the hydrolysis and the adhesion by chemical bonding of the silanol to a substrate. The amount of the catalyst may be in the range of 0.0005 to 0.1% by weight based on the total weight of the polymer.

The reaction can be carried out in a solvent. The solvents may be those which have no active hydrogen reacting with the isocyanato group and in which the fluorine-containing polymers having hydroxyl groups and the alkoxysilanes having isocyanato groups can be dissolved. For example, toluene, xylene, etc. can be used as the solvent. In particular, it is advantageous to choose the same solvent as that of the coating agents since the reaction mixture can be directly used as a coating agent.

Preferably, the amount of the solvent may be 30 to 95% by weight and the amount of the polymer may be 70 to 5% by weight.

The reaction is generally carried out at 10° to 70° C. for 1 to 3 hours. Preferably, the reaction is performed under an inert environment such as nitrogen, etc.

The fluorine-containing coating agents of the present invention contain the fluorine-containing polymer incorporating alkoxysilyl groups obtained by the above reaction. Generally, the polymers are utilized in solution systems using a solvent such as toluene, xylene, etc. The amount of the solvent may be 65 to 98% by weight and the amount of the polymer may be 35 to 2% by weight. Further, the coating agents of the present invention may optionally contain one or more additives, for example, pigments, dyestuffs, flexibility-imparting agents such as silicones, antioxidants, or others, depending on the purpose and/or use thereof.

The coating agents of the present invention can be applied to various substrates by any coating method usually utilized in the coating art, for example, brushing, spray coating, wire bar method, blade method, roller coating, dipping, etc. In such a manner, a film of the fluorine-containing polymer incorporating alkoxysilyl groups is formed on the surface of a substrate. This film can be adhered closely to the substrate by the action of the alkoxysilyl groups. Usually, such a coating film is formed at room temperature from the coating agent of the present invention. However, various temperature conditions may be utilized in order to control the coating film formation rate, although the usual temperature may be in the range of 5° to 60° C.

As described hereinabove, by utilizing the polymer in which a hydrolyzable alkoxysilyl group is introduced into the side chain of a fluorine-containing polymer, the fluorine-containing coating agents of the present invention can be closely adhered to the surface of various substrates made of a variety of materials, for example, metallic materials such as aluminum, copper, etc., inorganic materials such as glass, cement, etc., or organic materials such as plastics, including polyethylenes, polypropylenes, nylons, acrylic polymers, polyvinyl chlorides, etc., and wood, and will form surface coating films having excellent weather resistance, heat stability and solvent resistance.

The present invention will be illustrated by the following examples which are not construed as limiting the present invention.

EXAMPLE 1

A 200 ml stainless steel autoclave having a pressure resistance of 300 kg/cm$^2$ was provided, in which 116 g of t-butanol, 11.7 g of cyclohexyl vinyl ether, 11.1 g of ethyl vinyl ether, 7.2 g hydroxybutyl vinyl ether, 0.69 g of potassium carbonate and 0.06 g of azobisisobutylonitrile were charged. After the dissolved air in the mixture was removed by vacuum extraction under cooling, 36 g of chlorotrifluoroethylene was added to the mixture. The polymerization reaction was carried out at 65° to 75° C. for 8 hours under stirring. After the reaction mixture was cooled to room temperature, the unreacted chlorotrifluoroethylene was purged therefrom and the resulting polymer solution was treated with water to allow the polymer to separate. The thus obtained polymer was washed with water and dried to obtain 35 g of a fluorine-containing polymer having a hydroxyl group in the side chain. The polymer had an intrinsic viscosity ($\eta$) of 0.45 dl/g in tetrahydrofuran at 35° C. and a glass transition temperature (Tg) of 27° C.

To a solution of 15 g of the fluorinecontaining polymer having a hydroxyl group in the side chain were added 75 g of xylene, 8.6 g gamma-isocyanatopropyl triethoxy silane as an alkoxysilane having an isocyanato group and 0.0025 g of dibutyltin laurate as a curing catalyst, and the resulting mixture was stirred under a nitrogen atmosphere at room temperature for 2 hours.

The amounts of the fluorine-containing polymer having a hydroxyl group and gamma-isocyanatopropyl triethoxy silane used were such that the ratio of the number of hydroxyl groups to that of isocyanato groups was 1:1.5. An infrared adsorption spectrum of the thus obtained solution was measured. A small peak was observed in the absorption band of isocyanato group, whereas a large peak was observed in the absorption band of urethane linkage. Thus, the polymer which can be utilized as a coating agent according to the present invention was identified.

The solution of the polymer in xylene was stored at 50° C. in a closed system for 20 days. The flowability was then investigated: no gelling was observed and good flowability was retained. This indicates that this polymer solution can be utilized as a one package coating agent.

EXAMPLE 2

The procedures of Example 1 were repeated except that 8.6 g of gamma-isocyanatopropyl triethoxy silane was replaced by 7.5 g of gamma-isocyanatropropyl methyl diethoxy silane. Thus, a polymer was synthesized and an infra-red absorption spectrum of the polymer solution was measured.

As in Example 1, the formation of a polymer which can be utilized as a coating agent of the present invention was confirmed.

The polymer was subjected to the flowability test as in Example 1. No gelling was observed and the polymer retained good flowability.

EXAMPLE 3

Another fluorine-containing polymer having a hydroxyl group was obtained according to the same procedures of Example 1 except that chlorotrifluoroethylene was replaced with tetrafluoroethylene. The obtained polymer had an intrinsic viscosity ($\eta$) of 0.45 dl/g and a glass transition temperature (Tg) of 27° C.

Next, the procedure of Example 1 was repeated except taht the thus obtained polymer was used as a fluorine-containing polymer having a hydroxyl group in the side chain instead of the fluorine-containing polymer of Example 1. As a result, a polymer which can be utilized as a coating agent of the present invention was synthesized as in Example 1. The polymer was subjected to the flowability test as in Example 1. No gelling was observed and the polymer retained good flowability.

EXMPLE 4

A liquid mixture of 20 g of the fluorine-containing polymer having a hydroxyl group in the side chain of Example 3, 20 g of methyl isobutyl ketone and 4.0 g of titanium oxide was stirred and mixed for one hour in a glass bead agitator. To the resulting liquid, 3.4 g of gamma-isocyanatopropyl trimethoxy silane as an alkosysilane having an isocyanato group and 0.002 g of dibutyltin dilaurate as a curing catalyst were added and mixed. The resulting fluorine-containing coating agent was applied as a paint on a chromate-treated aluminum plate substrate by a wire bar method, and allowed to stand to dry. Thus, a coating film was formed on the surface of the substrate. The resulting coating film became tack free in 4 hours. After 3 days passed, the film was subjected to the following tests A to E. The results are shown in Table 1.

A. Xylol-rubbing test:

The surface of a coating film was rubbed by a cloth impregnated with xylol under a load of approximately 50 g. One going and returning of the cloth was counted as one cycle. Solvent resistance was evaluated by the number of cycles until a change was generated on the film surface.

B. Checkers test:

A sharp cutter was used to make checkers on the surface of a coating film so that squares of 1 mm in length of each side were arranged in 10×10. An adhesive-backed tape (Cello-Tape ®, Sekisui Chemical K.K.) was adhered to the cut surface and peeled off. The adhesion was evaluated by the number of remaining squares.

C. DuPont impact test:

A metal ball of ½ inch in diameter and 1 kg in weight was dropped on the surface of a coating film. The impact resistance was evaluated by the dropping distance at which crack or white color was first produced.

D. T bending test:

A coating film was formed on the surface of a steel plate of 0.2 mm in thickness. A certain number of steel plates having the same thickness was piled on the opposite surface of the film and the stacked plated were bent by 180° with the film being in outer side. The flexibility of the film was evaluated by the number of stacked plates at which a crack was generated at the bended portion. For example, "1 T" refers to one plate stacked. The smaller the number of stacked plates are, the more flexible the films are.

E. Pencil hardness:

A coating film was scratched by pencils of various hardnesses. The hardness of the film was evaluated by the hardness of the pencil by which a scratch was generated.

TABLE 1

| Test | Results |
| --- | --- |
| Xylol rubbing | 200 or more |
| Checkers | 100/100 |
| DuPont impact | 50 cm |
| T bending | 1 T |
| Pencil hardness | 4 H |

As seen from the above results, the fluorine-containing coating agents of the present invention can provide coating films of high hardness which are excellent in solvent resistance, adhesion to the surface of substrates, impact resistance, and flexibility.

EXAMPLE 5

The procedures of Example 4 were repeated except that instead of 3.4 g of gamma-isocyanatopropyl trimethoxy silane used as an alkoxysilane having an isocyanato group there was used 3.0 g of gamma-isocyanatopropyl methyl dimethoxy silane. The resulting coating film became tack free after 4 hours. After 3 days, the same tests as Example 4 were effected. The results are shown in Table 2.

TABLE 2

| Test | Results |
| --- | --- |
| Xylol rubbing | 200 or more |
| Checkers | 100/100 |
| DuPont impact | 40 cm |
| T bending | 2 T |
| Pencil hardness | 3 H |

As seen from the above results, the fluorine-containing coating agents of the present invention can provide highly hard films excellent in solvent resistance, adhesion to the surface of substrates, impact resistance, and flexibility, as in Example 4.

What is claimed is:

1. A fluorine-containing coating agent which can be used to form a fluorocarbon resin coating film on a substrate comprising a polymer which has a fluorine-containing polymer as a main chain and an alkoxysilyl group in the side chain and which is obtained by the reaction of a hydroxyl group of a fluorine-containing polymer having the hydroxyl group in the side chain with an isocyanato group of an alkoxysilane having the isocyanato group, wherein said fluorine-containing polymer having a hydroxyl group in the side chain is a copolymer of a fluoro-olefin and a hydroxyalkyl vinyl ether having a straight or branched alkyl group having 2 to 5 carbon atoms, and said alkoxysilane having an isocyanato group is a compound represented by the following formula:

$$OCN(CH_2)_3SiX_nR_{(3-n)} \qquad (I)$$

wherein

R is hydrogen or a monovalent hydrocarbon group having 1 to 10 carbon atoms,

X is an alkoxyl group having 1 to 5 carbon atoms, and n is an integer of 1 to 3.

2. The fluorine-containing coating agent in accordance with claim 1, wherein said fluorine-containing polymer having the hydroxyl group is a copolymer of a perhalogenated fluoro-olefin, the hydroxyalkyl vinyl ether, and an alkyl vinyl ether having an alkyl group selected from the group consisting of a cyclohexyl group and straight and branched alkyl groups having 1 to 8 carbon atoms, and the fluoro-olefin content based on the total monomer components is 40 to 70% by mole.

3. The fluorine-containing coating agent in accordance with claim 1, wherein said fluoro-olefin is a perhalogenated fluoro-olefin.

4. The fluorine-containing coating agent in accordance with claim 1, wherein said fluoro-olefin is chlorotrifluoroethylene, tetrafluoroethylene, or mixtures thereof.

5. The fluorine-containing coating agent in accordance with claim 1, wherein said hydroxyalkyl group of the hydroxyalkyl vinyl ether is a hydroxybutyl group.

6. The fluorine-containing coating agent in accordance with claim 1, wherein said alkoxysilane having an isocyanato group is one or more compounds selected from the group consisting of gamma-isocyanatopropyl methyl diethoxy silane, gamma-isocyanatopropyl triethoxy silane, gamma-isocyanatopropyl methyl dimethoxy silane, and gamma-isocyanatopropyl trimethoxy silane.

7. The fluorine-containing coating agent in accordance with claim 1, wherein said copolymer has 40 to 65% by mole of the fluoro-olefin, 5 to 40% by mole of cyclohexyl vinyl ether, 5 to 40% by mole of alkyl vinyl ethers other than cyclohexyl vinyl ether, and 3 to 15% by mole of hydroxyalkyl vinyl ethers.

8. The fluorine-containing coating agent in accordance with claim 1, wherein said fluorine-containing polymer having a hydroxy group has a molecular weight in the range from 1000 to 200,000 and 2 to 50 hydroxyl groups in the molecule.

9. The fluorine-containing coating agent in accordance with claim 1, which further includes a member selected from the group consisting of pigments, dyestuffs, flexibility-imparting agents, and antioxidants.

* * * * *